US012389447B2

(12) United States Patent
He

(10) Patent No.: US 12,389,447 B2
(45) Date of Patent: Aug. 12, 2025

(54) INFORMATION PROCESSING METHOD FOR SHARED SPECTRUM, TERMINAL DEVICE, AND NETWORK DEVICE

(71) Applicant: GUANGDONG OPPO MOBILE TELECOMMUNICATIONS CORP., LTD., Guangdong (CN)

(72) Inventor: Chuanfeng He, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 509 days.

(21) Appl. No.: 17/725,542

(22) Filed: Apr. 20, 2022

(65) Prior Publication Data

US 2022/0248464 A1 Aug. 4, 2022

Related U.S. Application Data

(63) Continuation of application No. PCT/CN2019/114800, filed on Oct. 31, 2019.

(51) Int. Cl.
*H04W 72/04* (2023.01)
*H04L 5/00* (2006.01)
*H04W 74/0808* (2024.01)

(52) U.S. Cl.
CPC ....... *H04W 74/0808* (2013.01); *H04L 5/0048* (2013.01)

(58) Field of Classification Search
CPC . H04W 74/0808; H04W 48/12; H04W 56/00; H04W 56/0015; H04W 56/006; H04W 24/02; H04W 24/08; H04W 72/0453; H04L 5/0048; H04L 5/0023; H04L 5/006; H04L 27/26025
See application file for complete search history.

(56) References Cited

U.S. PATENT DOCUMENTS

| 2018/0368054 A1 | 12/2018 | Sheng et al. |
| 2019/0037508 A1 | 1/2019 | Sun et al. |
| 2019/0150161 A1 | 5/2019 | Cheng et al. |

(Continued)

FOREIGN PATENT DOCUMENTS

| CN | 109788497 | 5/2019 |
| CN | 110235477 | 9/2019 |

(Continued)

OTHER PUBLICATIONS

Office Action of China Counterpart Application, Application No. 202210107811.6, with English translation thereof, issued on Jun. 17, 2023, pp. 1-12.

(Continued)

*Primary Examiner* — Mahbubul Bar Chowdhury
(74) *Attorney, Agent, or Firm* — Hodgson Russ LLP

(57) ABSTRACT

Disclosed is an information processing method, comprising: a terminal device receives position indication information sent from a network device, at least one bit of the position indication information indicating a first set comprising at least one synchronization signal block (SSB) position index, and the position indication information indicating the position where SSB measurement needs to be performed in a measurement window. Also disclosed are an information processing method, a terminal device, a network device, and a storage medium.

16 Claims, 10 Drawing Sheets

(56) References Cited

U.S. PATENT DOCUMENTS

| | | | |
|---|---|---|---|
| 2019/0215790 A1 | 7/2019 | Kim et al. | |
| 2020/0229093 A1* | 7/2020 | Ahmad | H04W 52/0209 |
| 2020/0280940 A1* | 9/2020 | Kim | H04J 11/0086 |
| 2021/0051485 A1* | 2/2021 | Lin | H04W 72/0446 |
| 2021/0058949 A1* | 2/2021 | Kim | H04W 72/1268 |
| 2021/0153107 A1* | 5/2021 | Xu | H04W 72/04 |
| 2021/0329507 A1* | 10/2021 | Yao | H04W 36/0085 |
| 2021/0400725 A1* | 12/2021 | Harada | H04L 5/0005 |
| 2022/0095253 A1* | 3/2022 | Harada | H04W 56/00 |
| 2022/0124648 A1* | 4/2022 | Harada | H04W 72/23 |
| 2022/0150800 A1* | 5/2022 | Harada | H04L 5/0091 |
| 2022/0263618 A1* | 8/2022 | Harada | H04L 5/0048 |
| 2022/0346128 A1* | 10/2022 | Ko | H04L 1/00 |
| 2023/0070204 A1* | 3/2023 | Kim | H04J 11/0073 |

FOREIGN PATENT DOCUMENTS

| | | |
|---|---|---|
| CN | 110249582 | 9/2019 |
| CN | 110351877 | 10/2019 |
| CN | 110392991 | 10/2019 |
| CN | 110583056 | 12/2019 |
| WO | 2018204665 | 11/2018 |
| WO | 2019160331 | 8/2019 |
| WO | 2020200096 | 10/2020 |

OTHER PUBLICATIONS

"Office Action of Europe Counterpart Application, Application No. 19950754.2", issued on Feb. 28, 2023, p. 1-p. 6.
Xiaomi. "On SSB transmission in NR unlicensed" 3GPP TSG RAN WG1 Meeting #94bis R1-1811416, Oct. 8-12, 2018, pp. 1-3.
Office Action of China Counterpart Application, Application No. 202210107811.6, with English translation thereof, issued on Apr. 7, 2023, pp. 1-15.
"International Search Report (Form PCT/ISA/210) of PCT/CN2019/114800," mailed on Jul. 28, 2020, with English translation thereof, pp. 1-4.
"Written Opinion of the International Searching Authority (Form PCT/ISA/237) of PCT/ CN2019/114800," mailed on Jul. 28, 2020, with English translation thereof, pp. 1-5.

Qualcomm Incorporated, "Initial access and mobility procedures for NR unlicensed," 3GPP TSG RAN WG1 Meeting #98bis, Oct. 2019, pp. 1-15.
"3rd Generation Partnership Project; Technical Specification Group Radio Access Network; NR; Radio Resource Control (RRC) protocol specification (Release 15)," 3GPP TS 38.331 V15.3.0, Sep. 2018, pp. 1-445.
Spreadtrum Communications, "Discussion on initial access and mobility in NR-U," 3GPP TSG RAN WG1 Meeting #98bis, Oct. 2019, pp. 1-15.
Intel Corporation, "Enhancements to initial access and mobility for NR-unlicensed," 3GPP TSG RAN WG1 Meeting #98bis, Oct. 2019, pp. 1-10.
"Search report of counterpart Europe application No. 19950754.2", issued on Jul. 28, 2022, pp. 1-9.
Charter Communications , "Feature lead summary 3 of Enhancements to initial access procedure", 3GPP TSG RAN WG1 Meeting #98BIS R1-1911685, Oct. 2019, pp. 1-19.
Office Action of India Counterpart Application, Application No. 202227026603, issued on Sep. 1, 2022, pp. 1-5.
Qualcomm Incorporated, "Initial access and mobility procedures for NR unlicensed", 3GPP TSG RAN WG1 Meeting #98 R1-1909246, Aug. 26-30, 2019, pp. 1-14.
LG Electronics, "Initial access and mobility for NR-U", 3GPP TSG RAN WG1 #98bis R1-1910820, Oct. 14-20, 2019, pp. 1-14.
"Office Action of China Counterpart Application, Application No. 202210107811.6", with English translation thereof, issued on Sep. 7, 2023, p. 1-p. 13.
"Office Action of Japan Counterpart Application, Application No. 2022-523644", with English translation thereof, issued on Sep. 19, 2023, p. 1-p. 6.
"Notice of Allowance of China Counterpart ApplicationApplication No. 202210107811.6", with English translation thereof,issued on Nov. 21, 2023, p. 1-p. 6.
VIVO, "Remaining issues on multi-TRP/Panel transmission", 3GPP TSG RAN WG1 #98 R1-1908166, Aug. 26-30, 2019, pp. 1-18.
"Office Action of Japan Counterpart Application, Application No. 2022-523644", with English translation thereof, issued on Jan. 30, 2024, p. 1-p. 7.
"Office Action of India Counterpart Application, Application No. 202227026603", issued on Dec. 26, 2024, p. 1-p. 2.

* cited by examiner

INFORMATION PROCESSING METHOD FOR SHARED SPECTRUM, TERMINAL DEVICE, AND NETWORK DEVICE

CROSS-REFERENCE TO RELATED APPLICATION

This application is a continuation of international PCT application serial no. PCT/CN2019/114800 filed on Oct. 31, 2019. The entirety of the above-mentioned patent application is hereby incorporated by reference herein and made a part of this specification.

BACKGROUND

Technical Field

The disclosure relates to mobile communication technology, and in particular to an information processing method, a terminal device, a network device, and a storage medium.

Description of Related Art

The unlicensed spectrum is a spectrum that may be used for radio device communications assigned by countries and regions. The spectrum is usually considered a shared spectrum, that is, communication devices in different communication systems may use the spectrum as long as the communication devices meet regulatory requirements set on the spectrum by a country or a region, and there is no need to apply for a proprietary spectrum authorization from the government. In order for various communication systems using the unlicensed spectrum for wireless communications to coexist friendly on the spectrum, some countries or regions have stipulated the regulatory requirements that must be met to use the unlicensed spectrum. For example, in European regions, a communication device follows the "listen-before-talk" (LBT) principle, that is, the communication device needs to perform channel listening before sending signals on a channel of the unlicensed spectrum. The communication device can only send the signals when the channel listening result is that the channel is idle. If the channel listening result of the communication device on the channel of the unlicensed spectrum is that the channel is busy, the communication device cannot perform signal transmission.

In the new radio-unlicensed (NR-U) system using an unlicensed carrier, for a primary cell (Pcell), the network device sends a dedicated reference signal (DRS) for access, measurement, etc. The DRS includes at least one synchronization signal block (SSB). Considering the uncertainty of acquisition of channel usage rights on the unlicensed spectrum, during the process of sending the SSB, the SSB is sent on a candidate position configured by the network device. The position where the network device actually sends the SSB may be any one of the candidate positions.

However, in the prior art, the position where the network device actually sends the SSB based on an SSB index indication of the SSB may cause the terminal device to measure the result of the SSB incorrectly.

SUMMARY

The embodiments of the disclosure provide an information processing method, a terminal device, a network device, and a storage medium, which can ensure the correctness of the result of the SSB measured by the terminal device.

In a first aspect, an embodiment of the disclosure provides an information processing method, which includes the following.

A terminal device receives position indication information sent by a network device. At least one bit of the position indication information represents a first set including at least one SSB position index. The position indication information indicates a position where SSB measurement needs to be performed in a measurement window.

In a second aspect, an embodiment of the disclosure provides an information processing method, which includes the following.

A network device sends position indication information to a terminal device. At least one bit of the position indication information represents a first set including at least one SSB position index. The position indication information indicates position where SSB measurement needs to be performed in a measurement window of the terminal device.

In a third aspect, an embodiment of the disclosure provides a terminal device, which includes the following.

A receiving unit is configured to receive position indication information sent by a network device. At least one bit of the position indication information represents a first set including at least one SSB position index. The position indication information indicates position where SSB measurement needs to be performed in a measurement window.

In a fourth aspect, an embodiment of the disclosure provides a network device, which includes the following.

A sending unit is configured to send position indication information to a terminal device. At least one bit of the position indication information represents a first set including at least one SSB position index. The position indication information indicates position where SSB measurement needs to be performed in a measurement window of the terminal device.

In a fifth aspect, an embodiment of the disclosure provides a terminal device, which includes a processor and a memory for storing a computer program capable of running on the processor. The processor is used to execute the steps of the information processing method executed by the terminal device when running the computer program.

In a sixth aspect, an embodiment of the disclosure provides a network device, which includes a processor and a memory for storing a computer program capable of running on the processor. The processor is used to execute the steps of the information processing method executed by the network device when running the computer program.

In a seventh aspect, an embodiment of the disclosure provides a storage medium stored with an executable program. When the executable program is executed by a processor, the information processing method executed by the terminal device is implemented.

In an eighth aspect, an embodiment of the disclosure provides a storage medium stored with an executable program. When the executable program is executed by a processor, the information processing method executed by the network device is implemented.

The information processing method provided by the embodiment of the disclosure includes the following. The network device sends the position indication information to the terminal device. The terminal device receives the position indication information sent by the network device. The at least one bit of the position indication information represents the first set including the at least one SSB position index. The position indication information indicates the position where the SSB measurement needs to be performed in the measurement window, thereby ensuring the correctness of the result of the SSB measured by the terminal device.

DETAILED DESCRIPTION OF DISCLOSED EMBODIMENTS

In order to understand the features and technical content of the embodiments of the disclosure in more detail, the implementation of the embodiments of the disclosure will be described in detail below with reference to the drawings. The attached drawings are for reference and explanation purposes only, and are not used to limit the embodiments of the disclosure.

Before describing in detail an information processing method provided by the embodiment of the disclosure, a new radio-unlicensed (NR-U) system of an unlicensed carrier and an SSB will be described first.

NR-U

The unlicensed spectrum is a spectrum that may be used for radio device communications divided by countries and regions. The spectrum is usually considered a shared spectrum, that is, communication devices in different communication systems may use the spectrum as long as the communication devices meet regulatory requirements set on the spectrum by a country or a region, and there is no need to apply for a proprietary spectrum authorization from the government. In order for various communication systems using the unlicensed spectrum for wireless communications to coexist friendly on the spectrum, some countries or regions have stipulated the regulatory requirements that must be met to use the unlicensed spectrum. For example, in European regions, a communication device follows the "listen-before-talk" (LBT) principle, that is, the communication device needs to perform channel listening before sending signals on a channel of the unlicensed spectrum. The communication device can only send the signals when the channel listening result is that the channel is idle. If the channel listening result of the communication device on the channel of the unlicensed spectrum is that the channel is busy, the communication device cannot perform signal transmission. In addition, in order to ensure fairness, in one transmission, the duration of the communication device using the channel of the unlicensed spectrum for signal transmission cannot exceed the maximum channel occupation time (MCOT).

Common channels and signals in the NR system, such as a physical broadcast channel (PBCH) and a synchronization signal (SS), need to cover the entire cell through multi-beam scanning, which is convenient for reception by a UE in the cell. The SS and the PBCH are packed together into one transmission block, the SSB. In other words, the SSB is the abbreviation of an SS/PBCH block. The multi-beam transmission of the SS is implemented through defining an SS burst set. One SS burst set contains one or more SSBs. One SSB is used to carry the SS and the PBCH of one beam. Therefore, one SS burst set may contain the synchronization signals of an SS block number of beams in the cell. A maximum number L of the SS block number is related to a frequency band of a system:

For frequency bands below 3 GHz, L=4;
For frequency bands from 3 GHz to 6 GHz, L=8;
For frequency bands from 6 GHz to 52.6 GHz, L=64.

Figure 1:
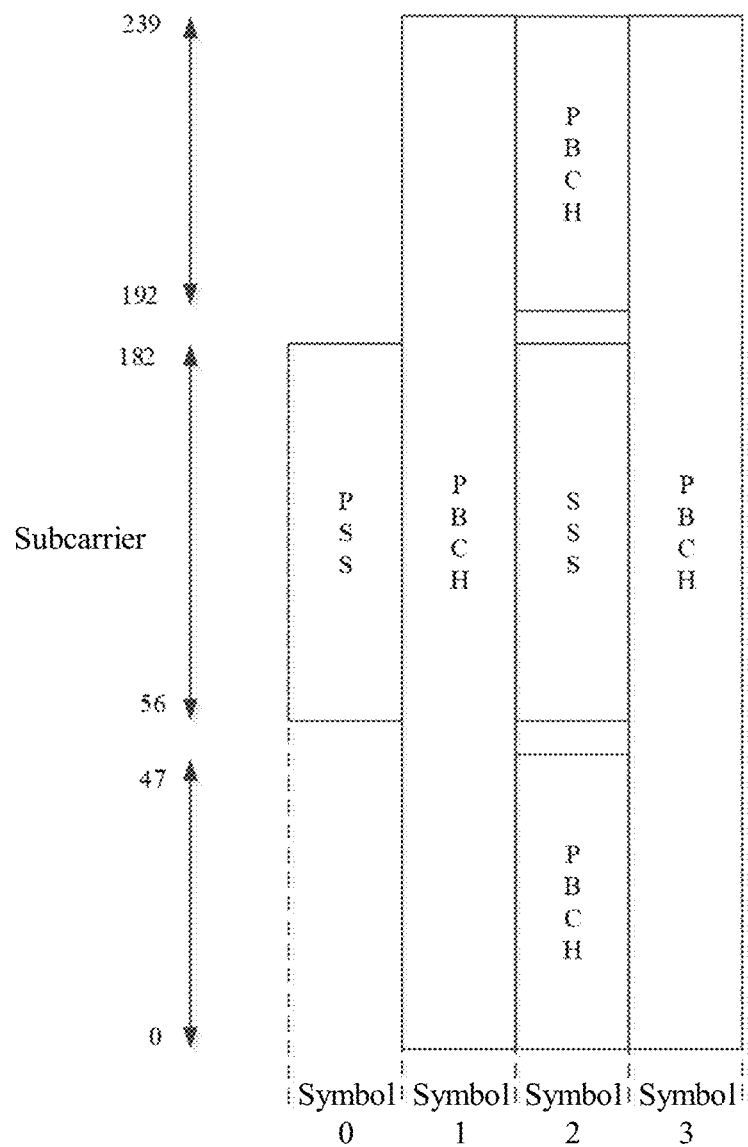
FIG. 1 is a schematic diagram of an optional structure of an SSB according to an embodiment of the disclosure.

One SSB includes a primary synchronization signal (PSS) of one symbol, a secondary synchronization signal (SSS) of one symbol, and NR-PBCH of two symbols, as shown in FIG. 1. A time-frequency resource occupied by the NR-PBCH contains a demodulation reference signal (DMRS). The DMRS is used for demodulation of the PBCH. In a time domain, the SSB consists of 4 orthogonal frequency division multiplexing (OFDM) symbols numbered from 0 to 3. In a frequency domain, the SSB consists of 240 consecutive subcarriers numbered from 0 to 239.

All SSB bearers in the SS burst set are sent in a time window of 5 ms, and are sent repeatedly in a specific period. The sending period is configured through high-level parameter SSB-timing. The sending period may include 5 ms, 10 ms, 20 ms, 40 ms, 80 ms, 160 ms, etc. For the UE, an SSB index of the SSB is obtained through the received SSB. The SSB index corresponds to a relative position of the SSB in the time window of 5 ms. The UE indicates frame synchronization according to the SSB index and half frames carried in the PBCH. The SSB index is indicated through the DMRS of the PBCH or other information carried by the PBCH.

Figure 2:
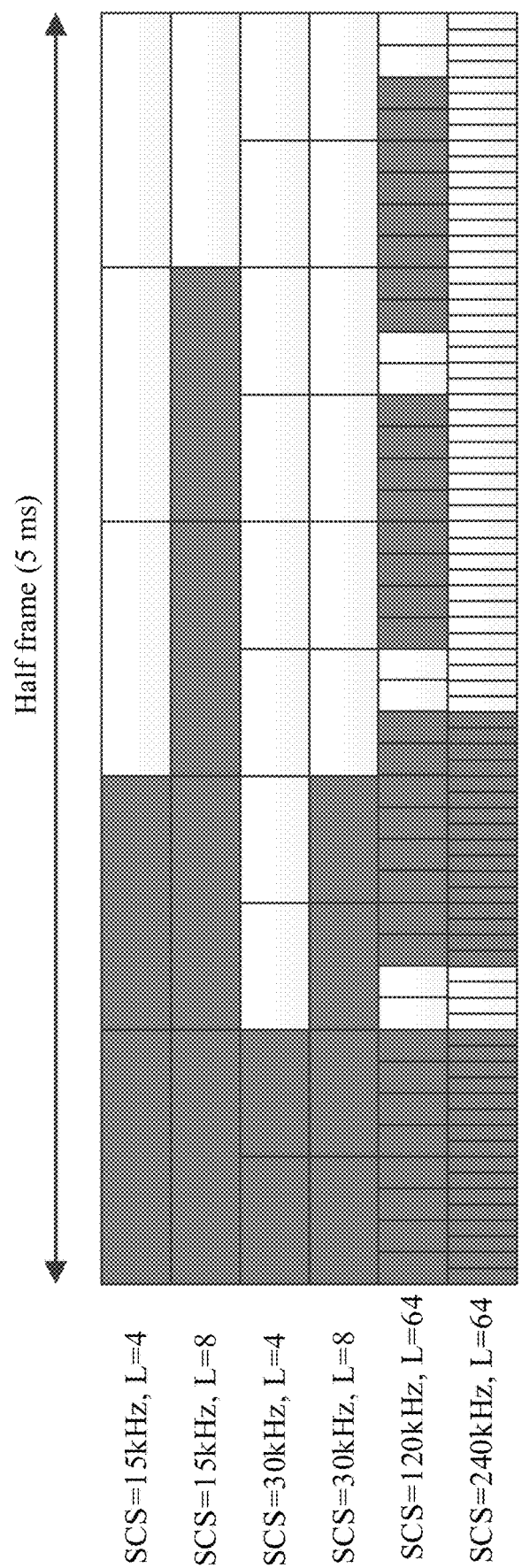
FIG. 2 is a schematic diagram of an optional time domain distribution of an SSB according to an embodiment of the disclosure.

Different subcarrier spacings (SCS) and time slot distribution of the SSB under a frequency band are shown in FIG. 2. Taking a subcarrier spacing of 15 kHz and L=4 as an example, one slot contains 14 symbols, two SSBs may be carried, and 4 SSBs are distributed in the first two slots in the time window of 5 ms. Taking the subcarrier spacing of 15 kHz and L=4 as an example, one slot contains 14 symbols, two SSBs may be carried, and 8 SSBs are distributed in the first four slots in the time window of 5 ms. Taking a subcarrier spacing of 30 kHz and L=4, as an example, one slot contains 14 symbols, two SSBs may be carried, and 4 SSBs are distributed in the first two slots in the time window of 5 ms. Taking the subcarrier spacing of 30 kHz and L=8 as an example, one slot contains 14 symbols, two SSBs may be carried, and 8 SSBs are distributed in the first four slots in the time window of 5 ms. Taking a subcarrier spacing of 120 kHz and L=64 as an example, one slot contains 14 symbols, two SSBs may be carried, and 64 SSBs are distributed in 32 slots in the time window of 5 ms. Taking a subcarrier spacing of 240 kHz and L=64 as an example, one slot contains 14 symbols, two SSBs may be carried, and 64 SSBs are distributed in 32 slots in the time window of 5 ms. Where, L is the maximum number of SSBs carried in one measurement window, and the number of SSBs actually carried may be less than L.

Figure 3:
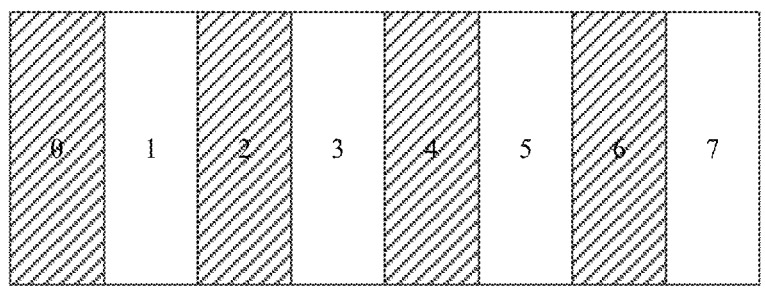
FIG. 3 is a schematic diagram of an optional SSB sending position provided by an embodiment of the disclosure.

A network device notifies a terminal device of a position of an SSB actually sent through system information in the form of a bitmap. The number and the position of SSBs actually sent are determined by the network device, such as a base station. For example, in a frequency band below 6 GHz of a licensed spectrum, one measurement window contains at most 8 SSBs, and the values of the SSB indexes are 0 to 7. The base station notifies the UE of the SSB sent through an 8-bit bitmap. The SSB indexes respectively corresponding to the 8-bit bitmap are 0 to 7. Each bit represents whether an SSB is sent or not, so that the UE may perform speed matching. As shown in FIG. 3, in a manner of the SSB, the SSB indexes of the SSBs actually sent are 0, 2, 4, and 6. If the SSBs are not sent on positions where the SSB indexes are 1, 3, 5, and 7, the 8-bit bitmap carried in a system message is "10101010".

The SSB index is used for the frame synchronization on one hand and for the UE to obtain a QCL relationship of the SSBs on the other hand. If the SSB indexes of the SSBs received at different times are the same, the SSBs are considered as being quasi co-located or having a quasi-co-location (QCL) relationship. Specifically, the description related to the QCL in the current protocol is as follows. If large-scale parameters of a channel on one antenna port may be derived from another antenna port, the two antenna ports are considered to be quasi co-located. The large-scale parameters include Doppler delay, average delay, spatial reception parameters, etc. In other words, when two SSBs are quasi co-located, the large-scale parameters (such as Doppler delay, average delay, spatial reception parameters, etc.) of the two SSBs may be considered as being inferable from each other or may be considered similar. During measurement, the UE may filter the SSBs which are quasi co-located as the measurement result of the beam level.

In the NR-U system, for a primary cell (Pcell), the network device sends a detection reference signal (DRS) for access, measurement, etc. The DRS includes at least SSB. Considering the uncertainty of acquisition of channel usage rights on the unlicensed spectrum, during the process of sending the SSB, due to the possibility of LBT failure, and the SSB may not be successfully sent at the predetermined time, the chances of sending the SSB may be increased, that is, in one DRS transmission window, a number Y of candidate positions for sending the SSBs configured by the network device is greater than a number X of the SSBs actually sent by the network device. In other words, for each DRS transmission window, the network device may determine using X available candidate positions among the Y candidate positions to transmit the SSBs according to the detection result of the LBT in the DRS transmission window.

Figure 4:
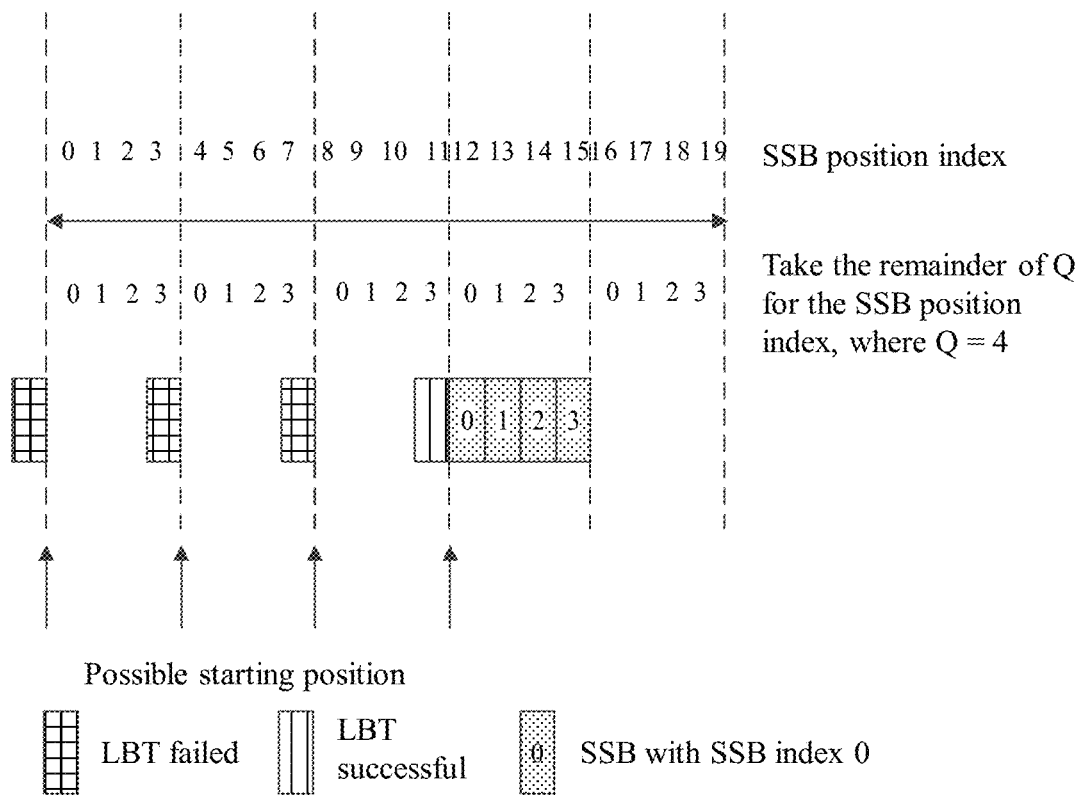
FIG. 4 is a schematic diagram of an optional SSB sending position provided by an embodiment of the disclosure.

In an example, the DRS transmission window is 5 ms, and the maximum number of SSBs sent is 4. In the time window of 5 ms, for a subcarrier spacing of 15 kHz, there are Y=10 candidate positions, and for a subcarrier spacing of 30 kHz, there are Y=20 candidate positions. As shown in FIG. 4, when the base station succeeds in performing the LBT before a candidate position 12, start sending SSBs with SSB indexes respectively being 0 to 3 on the candidate position 12. According to the time when the LBT is successful, the actual sending position of the SSB may be any one of the Y candidate positions.

For the sending manner of the SSB defined in the NR-U, since the UE needs to obtain the frame synchronization through the SSB received on the candidate position, an SSB position index needs to be defined for the candidate position. In an example, taking L=4 and Y=20 as an example, since a maximum of 4 SSBs may be sent on 20 candidate positions, the SSB position index carried by the SSB needs to be expanded from 0 to 19, so that the UE may obtain the position of the received SSB to further obtain the frame synchronization.

Figure 5:
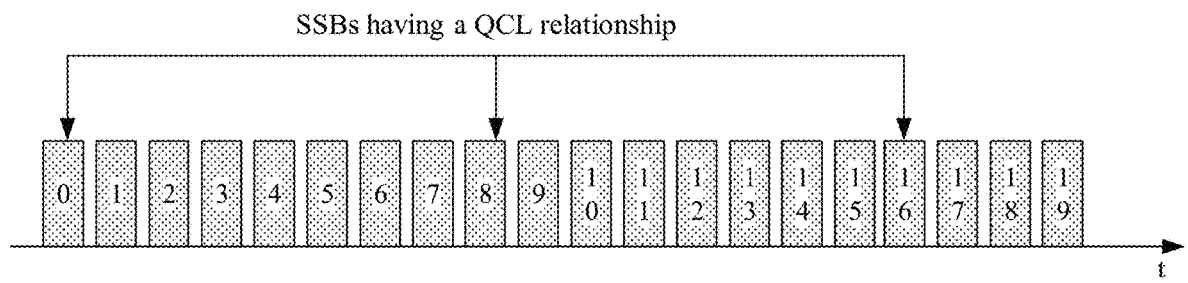
FIG. 5 is a schematic diagram of an optional SSB being quasi co-located provided by an embodiment of the disclosure.

In addition, the UE also needs to obtain the SSB position index through the received SSB, and obtain the QCL relationship of the SSBs through the obtained SSB position index. The method for obtaining the QCL relationship of the SSBs is that the SSBs with the same result after taking the remainder of a specified value Q for the SSB position indexes are quasi co-located or the SSBs with the same result after taking the remainder of Q according to the lowest three bits of the SSB position indexes, that is, a PBCH DMRS sequence index, are quasi co-located. Taking Q=8 as an example, as shown in FIG. 5, the SSBs with the SSB position indexes of 0, 8, and 16 are quasi co-located.

Q indicates for the network device. Q may be carried by the PBCH or the system message. After the UE receives the SSBs, the QCL relationship of the SSBs may be obtained according to the received Q and SSB position indexes. The SSBs which are quasi co-located may be jointly processed to improve performance.

In the NR technology, the network device may configure the UE to perform radio resource management (RRM) measurement based on the SSB through configuring a measurement object for the UE. An information element for configuring the measurement object is an NR measurement object (MeasObjectNR). The MeasObjectNR contains a frequency domain position of the SSB, SSB time domain window measurement timing configurations (SMTC) information, and an information element SSB measurement SSB-ToMeasure of the position of the SSB that needs to be measured in the SMTC. The content of the SSB-ToMeasure includes:

SSB-ToMeasure information element
SSB-ToMeasure::=CHOICE {
shortBitmap BIT STRING (SIZE (4)),
mediumBitmap BIT STRING (SIZE (8)),
longBitmap BIT STRING (SIZE (64))

The information element SSB-ToMeasure is a mode for configuring the SSB for the UE and includes three modes, which are SSBs with a bit number 4 of a short bitmap (shortBitmap), a bit number 8 of a medium bitmap (mediumBitmap), or a bit number 64 of a long bitmap (longBitmap) respectively under frequency bands of less than 3 GHz, between 3 to 6 GHz, and greater than 6 GHz. When the frequency band is less than 3 GHz, 4 SSBs are configured for the UE, and the bit number of the bitmap is 4; when the frequency band is between 3 and 6 GHz, 8 SSBs are configured for the UE, and the bit number of the bitmap is 8; and when 20 SSBs are configured for the UE, the bit number of the bitmap is 64.

Bits in the bitmap sequentially correspond to the SSB indexes in order from left to right. The leftmost bit corresponds to an SSB index 0, the second bit from the left corresponds to an SSB index 1, and so on. A bit of 1 in the bitmap represents that the UE needs to measure the SSB corresponding to the bit, and a bit of 0 represents that the UE does not need to measure the SSB corresponding to the bit.

In the NR-U system, in the DRS transmission window, the sending position of the SSB is no longer determined and is sent on the candidate position of the SSB based on the result of the LBT. Therefore, the network device cannot indicate the SSB index of the SSB that the UE needs to measure according to the foregoing manner. Otherwise, the position of the measured SSB indicated by the base station will be inconsistent with the position of the SSB actually sent, which causes the measurement result to be incorrect.

Based on the above issue, the embodiment of the disclosure provides an information processing method. The information processing method of the embodiment of the disclosure may be applied to various communication systems, such as a long term evolution (LTE) system, an LTE frequency division duplex (FDD) system, an LTE time division duplex (TDD) system, a universal mobile telecommunication system (UMTS), a 5G system, or a future communication system.

Figure 6:
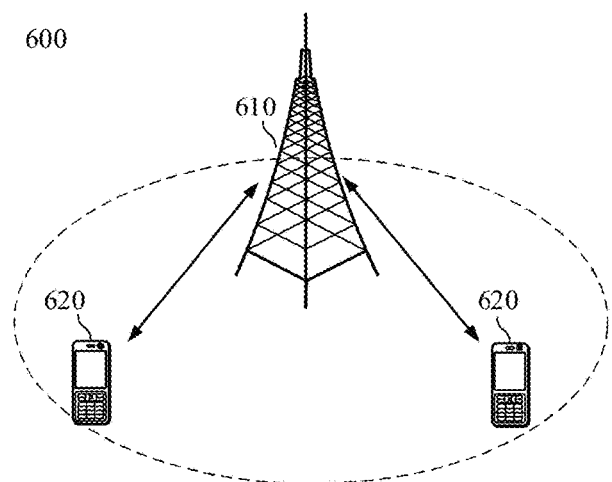
FIG. 6 is a schematic diagram of an optional composition structure of a communication system according to an embodiment of the disclosure.

Exemplarily, a communication system 600 applied in the embodiment of the disclosure is shown in FIG. 6. The communication system 600 may include a network device 610. The network device 610 may be a device that communicates with a terminal device 620 (also referred to as a communication terminal or a terminal). The network device 610 may provide communication coverage for a specific geographical area and may communicate with the terminal device located in the coverage area. Optionally, the network device 610 may be an evolutional node B (eNB or eNodeB) in an LTE system, a node B (gNB) in an NR/5G system, or a wireless controller in a cloud radio access network (CRAN).

The communication system 600 may also include a wireless controller in a cloud radio access network (CRAN), a network-side device in a mobile switching center, a relay station, an access point, an on-board device, a wearable device, a hub, a switch, a network bridge, a router, and a 5G network, a network device in a future evolutional public land mobile network (PLMN), etc.

The communication system 600 further includes at least one terminal device 620 located in the coverage range of the at least one network device 610. As used herein, the "terminal device" includes, but is not limited to, connection via a wired line, such as connection via public switched telephone networks (PSTN), a digital subscriber line (DSL), a digital cable, a direct cable; another data connection/network; a wireless interface, such as for a cellular network and a wireless local area network (WLAN), a digital television network such as a DVB-H network, a satellite network, and an AM-FM broadcast transmitter; a device of another terminal that is set to receive/send communication signals; and/or an Internet of things (IoT) device. A terminal device set to communicate through a wireless interface may be referred to as a "wireless communication terminal", a "wireless terminal", or a "mobile terminal". Examples of the mobile terminal include, but are not limited to, a satellite or cellular telephone; a personal communications system (PCS) terminal that may combine a cellular radio telephone with data processing, fax, and data communication capabilities; a PDA that may include a radio telephone, a pager, an Internet/Intranet access, a Web browser, a notebook, a calendar, and/or a global positioning system (GPS) receiver; and a conventional laptop and/or palmtop receiver or other electronic devices including a radio telephone transceiver. The terminal device may refer to an access terminal, a user equipment (UE), a user unit, a user station, a mobile station, a mobile station, a remote station, a remote terminal, a mobile device, a user terminal, a terminal, a wireless communication device, a user agent, or a user device. The access terminal may be a cellular telephone, a cordless telephone, a session initiation protocol (SIP) telephone, a wireless local loop (WLL) station, a personal digital assistant (PDA), a handheld device with wireless communication functional, a computing device, other processing devices, on-board devices, and wearable devices connected to wireless modems, a terminal device in a 5G network, a terminal device in a future evolutional PLMN, etc.

Optionally, the 5G system or the 5G network may also be referred to as a new radio (NR) system or a NR network.

FIG. 6 exemplarily shows a network device and two terminal devices. Optionally, the communication system 600 may include multiple terminal devices and multiple network devices, and other numbers of terminal devices may be included in the coverage range of each network device, which are not limited in the embodiment of the disclosure.

Optionally, the communication system 600 may also include other network entities such as a network controller and a mobility management entity, which are not limited in the embodiment of the disclosure.

Figure 7:
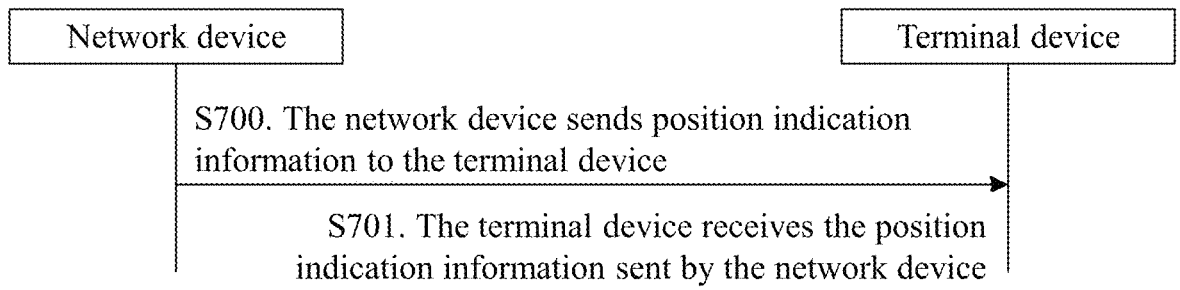
FIG. 7 is a schematic diagram of an optional processing flow of an information processing method according to an embodiment of the disclosure.

An optional processing flow of the information processing method provided by the embodiment of the disclosure, as shown in FIG. 7, includes the following.

In S701, a terminal device receives position indication information sent by a network device.

At least one bit of the position indication information represents a first set including at least one SSB position index. The position indication information indicates position where SSB measurement needs to be performed in a measurement window.

In the embodiment of the disclosure, as shown in FIG. 7, before S701, the method further includes the following.

In S700, the network device sends the position indication information to the terminal device.

At least one bit of the position indication information represents a first set including at least one SSB position index. The position indication information indicates position where SSB measurement needs to be performed in a measurement window of the terminal device.

The position indication information includes at least one bit. Taking the position indication information including one bit as an example, the bit included in the position indication information represents the first set, and the first set includes at least one SSB position index. Taking the position indication information including multiple bits as an example, optionally, the position indication information includes M bits, and one bit among the M bits represents the first set; or optionally, the position indication information includes M bits, each of N bits respectively represents the first set, the SSB position indexes in the first set represented by different bits do not overlap, and N is less than or equal to M.

In the case where the position indication information includes multiple bits, optionally, the bits in the position indication information respectively represent the first set, optionally, a part of the bits in the position indication information respectively represent the first set, and a part of the bits are reserved bits. In an example, the reserved bits are undefined bits.

Optionally, the position indication information is a bitmap. In other words, a positional coding of a bit represents the first set corresponding to the bit.

Optionally, the bit number of the position indication information is a fixed number. Optionally, the bit number of the position indication information is not a fixed number. Taking the bit number being a fixed number as an example, the bit number is 8. Taking the bit number of the position indication information being not a fixed number as an example, the bit number of the position indication information is related to the following parameters: the frequency band, the subcarrier spacing, and the length of the measurement window.

The bit number of the position indication information being related to the following parameters: the frequency band, the subcarrier spacing, and the length of the measurement window is taken as an example. In an example, the bit number is related to the frequency band. For example, when the frequency band of the terminal is less than 3 GHz, the bit number is 4; when the frequency band of the terminal is between 3 GHz and 6 GHz, the bit number is 8; and when the frequency band of the terminal is greater than 6 GHz, the bit number is 64. In an example, the bit number is related to the subcarrier spacing. For example, when the subcarrier spacing of the terminal is 15 KHz, the bit number is 10; and when the subcarrier spacing of the terminal is 30 KHz, the bit number is 20. In an example, the bit number is related to the length of the measurement window. For example, when the length of the measurement window is 1 ms, the bit number is 2; when the length of the measurement window is 2 ms, the bit number is 4; and when the length of the measurement window is 3 ms, the bit number is 6. In an example, the bit number is related to the subcarrier spacing and the length of the measurement window. For example, when the subcarrier spacing is 15 KHz and the length of the measurement window is 1 ms, the bit number is 2; when the subcarrier spacing is 15 KHz and the length of the measurement window is 2 ms, the bit number is 4; when the subcarrier spacing is 15 KHz and the length of the measurement window is 3 ms, the bit number is 6; when the subcarrier spacing is 30 KHz and the length of the measurement window is 1 ms, the bit number is 4; when the subcarrier spacing is 30 KHz and the length of the measurement window is 2 ms, the bit number is 8; and when the subcarrier spacing is 30 KHz and the length of the measurement window is 3 ms, the bit number is 12. In an example, the bit number is related to the frequency band, the subcarrier spacing, and the length of the measurement window. For example, when the frequency band is between 3 GHz and 6 GHz, the subcarrier spacing is 15 KHz, and the length of the measurement window is 1 ms, the bit number is 2; when the frequency band is between 3 GHz and 6 GHz, the subcarrier spacing is 30 KHz, and the length of the measurement window is 1 ms, the bit number is 4; when the frequency band is greater than 6 GHz, the subcarrier spacing is 15 KHz, and the length of the measurement window is 1 ms, the bit number is 4; and when the frequency band is greater than 6 GHz, the subcarrier spacing is 30 KHz, and the length of the measurement window is 1 ms, the bit number is 8.

In the embodiment of the disclosure, the relationship between the bit number of the position indication information and one or more parameters among the frequency band, the subcarrier spacing, and the length of the measurement window may be set according to actual requirements.

In the embodiment of the disclosure, the first set includes one or more SSB position indexes. Optionally, the first set includes multiple SSB position indexes, that is, the number of the position index in the first set is greater than 1. When the first set represented by a first bit includes multiple SSB position indexes, the first bit can represent multiple SSB position indexes. Optionally, the first set includes one SSB position index, that is, the number of the position index in the first set is 1. When the first set represented by a second bit includes one SSB position index, the second bit can only represent one SSB position index.

Taking the number of the SSB position index in the first set being greater than 1 as an example, optionally, the SSBs carried on the candidate positions corresponding to the SSB position indexes in the first set are quasi co-located. At this time, the meaning of the bit representing the first set is Meaning 1: the bit represents the SSB position indexes of multiple SSBs which are quasi co-located.

Optionally, the SSBs carried on the candidate positions corresponding to the SSB position indexes in the first set in the measurement window are quasi co-located. At this time, Meaning 1 is that the bit represents the SSB position indexes of multiple SSBs which are quasi co-located in the measurement window.

In the case where the meaning of the bit representing the first set is Meaning 1, the relationship between the bit and the SSB position indexes in the first set includes a result SSB position indexes in the first set mod a specified value being the same; where the results have a corresponding relationship with the bit.

Optionally, the result having the corresponding relationship with the bit includes the result being a position number of the bit of the position indication information.

Optionally, a manner for determining the result includes one of the following manners.

For Manner 1, the remainder of the specified value is taken through the lowest three bits of the SSB position indexes.

For Manner 2, the remainder of the specified value is taken through the PBCH DMRS sequence index corresponding to the SSB position indexes.

Optionally, the lowest three bits of a binary code of the SSB position indexes are the same as the PBCH DMRS sequence index. In an example, the lowest three bits of the binary code of the SSB position index is 001, and the PBCH DMRS sequence index is 001.

In the embodiment of the disclosure, the specified value is:
  pre-defined by the terminal device is; or
  indicated by the network device.

In the case where the specified value is indicated by the network device, the network device configures the specified value to the terminal device.

Optionally, the specified value is equal to or less than the bit number.

In the case where the specified value is less than the bit number, among first specified value bits in the position indication information, the SSBs corresponding to different SSB position indexes represented by the same bit are quasi co-located.

The number of the SSB position index in the first set being greater than 1 is taken as an example.

Optionally, the SSB position indexes of a part of the candidate positions in the measurement window correspond to the position indication information; and the position indication information corresponding to the SSB position indexes of the candidate positions other than the part of the candidate positions in the measurement window is determined by the position indication information corresponding to the SSB position indexes of the part of the candidate positions. At this time, the meaning of the bit representing the first set is Meaning 2: the bit represents the SSB position indexes corresponding to the candidate positions and the candidate positions shifted backward by the bit number of the position indication information candidate positions in the measurement window.

In an example, when the position indication information is 8 bits, there are 20 candidate positions in the measurement window, and the SSB position indexes are respectively 1 to 19, the position indication information corresponds to the candidate positions with the SSB position indexes 0 to 7, and the position indication information corresponding to the candidate positions 8 to 19 is determined by the position indication information corresponding to the SSB position indexes 0 to 7.

Optionally, a manner for determining the position indication information corresponding to the SSB position indexes of the candidate positions other than the part of the candidate positions in the measurement window according to the position indication information corresponding to the SSB position indexes of the candidate positions of the part of the candidate positions includes the following.

The position indication information corresponding to the SSB position indexes of the part of the candidate positions is copied, so that a sum of the bit number of the position indication information corresponding to the SSB position indexes of the part of the candidate positions and the bit number of the copied position indication information is the same as the number of candidate positions in the measurement window. Here, the combination of the received position indication information and the copied position indication information may be referred to as expanded position indication information. The expanded position indication information indicates the candidate positions that need to perform SSB measurement among all the candidate positions in the measurement window.

In the case where the number of the SSB position index in the first set is 1, the bit corresponds to the SSB position index in the first set. At this time, the meaning of the bit representing the first set is Meaning 3. The bit represents the SSB position index of the corresponding candidate position in the measurement window.

In the embodiment of the disclosure, in addition to Meaning 1, Meaning 2, and Meaning 3, the meaning of the bit representing the first set may be set according to actual requirements, which is not limited in the embodiment of the disclosure.

In the embodiment, the measurement window may be a DRS transmission window.

In the embodiment of the disclosure, the position indication information indicates the position where one or more cells need to perform SSB measurement in the measurement window. In the case where the position indication information indicates the positions where multiple cells need to perform SSB measurement, the cells share one position indication information.

In the embodiment of the disclosure, when the value of the bit of the position indication information is a first value, the candidate position corresponding to the SSB position index in the first set represented by the bit needs to perform SSB measurement; and when the value of the bit of the position indication information is a second value, the candidate position corresponding to the SSB position index in the first set represented by the bit does not need to perform SSB measurement. In an example, the first value is 1 and the second value is 0. In an example, the first value is 0 and the second value is 1.

Taking the position indication information indicating the position where a cell needs to perform SSB measurement as an example, in the position indication information, the value of the bit representing the candidate position where the cell needs to perform SSB measurement is the first value; and the value of the bit representing the candidate position where the cell does not need to perform SSB measurement is the second value.

In an example, the SSB position indexes of the candidate positions where a cell 1 needs to perform SSB measurement are 0, 1, and 2, and the SSB position indexes indicated by the position indication information include 0, 1, and 2, wherein the value representing the SSB position indexes including 0, 1, and 2 is taken as the first value.

Taking the position indication information indicating the positions where multiple cells need to perform SSB measurement as an example, in the position indication information, the candidate positions represented by the bit whose value is the first value is the result of the superposition of the candidate positions where multiple cells need to perform SSB measurement; and the candidate position represented by the bit whose value is the second value is the candidate position where any cell of the cells does not need to perform SSB measurement.

In an example, the SSB position indexes of the candidate positions where the cell 1 needs to perform SSB measurement are 0, 1, and 2, the SSB position indexes of the candidate positions where a cell 2 needs to perform SSB measurement are 1, 2 and 3, and the SSB position indexes of the candidate positions where a cell 3 needs to perform SSB measurement are 2, 3, and 4. When the candidate positions of the cell 1, the cell 2, and the cell 3 that need to perform SSB measurement are superimposed, the SSB position indexes of the candidate positions that need to perform measurement include 0, 1, 2, 3, and 4, which represents that the value of the bit whose SSB position indexes include 0, 1, 2, 3, and 4 is the first value.

After the network device determines the bit number of the position indication information, the position indication information is determined according to the meaning of the bit representing the first set.

Taking the meaning of the bit representing the first set being Meaning 1 or Meaning 2 as an example, the network device sets the bit corresponding to the result obtained by taking the remainder of the specified value through the SSB position index of the candidate position where SSB measurement needs to be performed in the position indication information as the first value.

When taking the remainder of the specified value through the SSB position index of the candidate position where SSB measurement needs to be performed, the remainder of the specified value may be taken through the lowest three bits of the SSB position indexes or the remainder of the specified value may be taken through the PBCH DMRS sequence index corresponding to the SSB position indexes. Here, the specified value may be identified through Q.

Taking the position information being the bitmap as an example, a mod specified value of the lowest three bits of the SSB position indexes or a mod specified value of the PBCH DMRS sequence index is used to obtain the position number of the bit whose value needs to be set as the first value in the position indication information.

In the embodiment of the disclosure, the specified values of different cells may be the same or different. In the case where the specified values of different cells are different, the network device obtains the position indication information of each cell according to the different specified values, and superimposes multiple different position indication information to obtain the position indication information corresponding to multiple cells as the position indication information shared by the cells.

In an example, the position indication information is the bitmap. The SSB position indexes of the candidate positions where SSB measurement needs to be performed include 0, 1, 2, 8, 9, and 10, Q is 8, the bit number is 8, the first value is 1, the second value is 0, and Y is 20. When the position numbers obtained by the network device through taking the remainder of Q for the SSB position indexes of the candidate positions where SSB measurement needs to be performed are 0, 1, and 2, the bit whose position numbers are 0, 1, and 2 in the position indication information is set as 1, and the obtained bitmap of the position indication information is 11100000.

Taking the meaning of the bit representing the first set being Meaning 3 as an example, the network device sets the bit corresponding to the SSB position index of the candidate position where SSB measurement needs to be performed in the position indication information as the first value.

Taking the position indication information being the bitmap as an example, the network device sets the bit corresponding to the position number of the SSB position index of the candidate position where the SSB measurement needs to be performed in the position indication information as the first value. When the meaning of the bit representing the first set is Meaning 3, the bit number of the position indication information is the same as the number Y of candidate positions.

In an example, the position indication information is the bitmap, the SSB position indexes of the candidate positions where SSB measurement needs to be performed include 0, 1, 2, 8, 9, and 10, Q is 8, L is 20, the bit number is 20, the first value is 1, and the second value is 0. When the position numbers of the SSB position indexes of the candidate positions where SSB measurement needs to be performed as determined by the network device are 0, 1, 2, 8, 9, and 10, the bit whose position numbers are 0, 1, 2, 8, 9, 10, 0, 1, and 2 in the position indication information is set as 1, and the obtained bitmap of the position indication information is 11100000111000000000.

Optionally, the frequency band used for communication between the terminal device and the network device is an unlicensed frequency band, and the network device notifies the terminal device of the position indication information through system information.

Optionally, an information element carrying the position indication information is an information element for configuring a measurement object, for example, MeasObjectNR.

Figure 8:
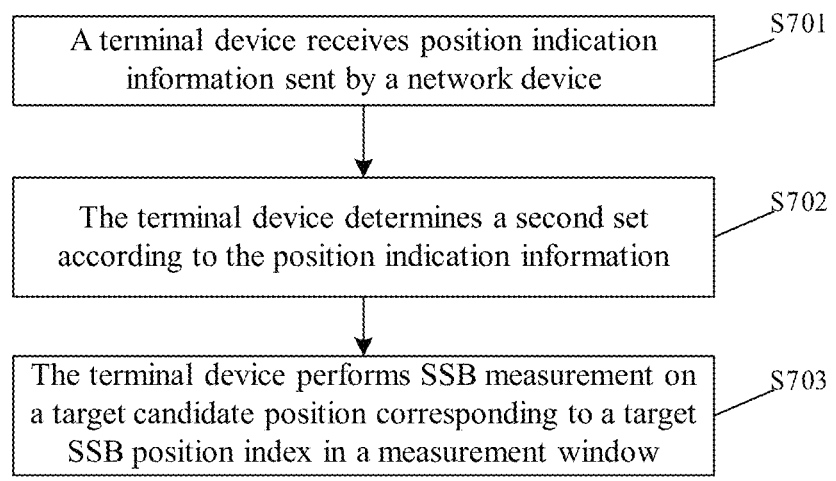
FIG. 8 is a schematic diagram of an optional processing flow of an information processing method according to an embodiment of the disclosure.

In the embodiment of the disclosure, as shown in FIG. 8, after S701, the method further includes the following In S702, the terminal device determines a second set according to the position indication information.

The second set is a set of the first set represented by the bit whose value is the first value in the position indication information. Here, the SSB position index of the candidate position where measurement needs to be performed is referred to as a target SSB position index, and the second set includes at least one target SSB position index.

Taking the meaning of the bit representing the first set being Meaning 1 as an example, optionally, S702 includes the terminal device obtaining the second set according to the specified value and the bit whose value is the first value in the position indication information.

Taking the meaning of the bit representing the first set being Meaning 1 and the position indication information being the bitmap as an example, the terminal device performs an inverse operation of taking the remainder of the position number of the bit whose value is the first value in the position indication information according to the specified value to determine the second set.

In an example, the bitmap of the position indication information is 11100000, Q is 8, the bit number is 8, the first value is 1, the second value is 0, and Y is 20. When an SSB position index set obtained by the terminal device performing the inverse operation of taking the remainder of the position indication information according to Q is {0, 1, 2, 8, 9, 10}, the target SSB position indexes are 0, 1, 2, 8, 9 and 10, and the SSBs on the candidate positions whose SSB position indexes are 0 and 8, 1 and 9, and 2 and 10 are quasi co-located.

In the embodiment of the disclosure, the specified values of different cells may be the same or different. In the case where the specified values of different cells are different and multiple cells share the same position indication information, the terminal device obtains the second set corresponding to each specified value according to the different specified values and the position indication information, and uses a union of the second set of each specified value as the final second set. At this time, the terminal device can measure the SSBs of multiple cells based on one target position index set.

Taking the meaning of the bit representing the first set being Meaning 2 as an example, optionally, S702 includes that the terminal device uses the bit number in the position indication information as a spacing to respectively correspond the candidate positions in the measurement window with the bit of the position indication information, and obtain the second set according to the SSB position index of the candidate position corresponding to the bit whose value is the first value in the position indication information.

Here, the SSB position indexes of all the candidate positions in the measurement window are divided into sets by the bit number, and each set of the SSB position index is corresponded with the position indication information. The SSB position index corresponding to the bit whose value is the first value in the position indication information is used as the target SSB position index to obtain the second set. The position indication information may be copied, and the copied position indication information may be expanded to other sets of SSB position indexes other than the first set of SSB position index, so that each SSB position index has a corresponding bit.

In an example, when Y is 20, the SSB position indexes of all the candidate positions are 0 to 19, and the position indication information is 11100110, 11100110 is respectively corresponded with the SSB position indexes 0 to 7, 8 to 15, and 16 to 19. The target position indexes are determined to include 0, 1, 2, 5, 6, 8, 9, 10, 13, 14, 16, 17, and 18, and the target position index set is {0, 1, 2, 5, 6, 8, 9, 10, 13, 14, 16, 17, 18}.

Taking the meaning of the bit representing the first set being Meaning 3 as an example, S702 includes the terminal device obtaining the second set according to the bit whose value is the first value in the position indication information.

Taking the meaning of the bit representing the first set being Meaning 3 and the position indication information being the bitmap as an example, the terminal device obtains the second set according to the position number of the bit whose value is the first value in the position indication information.

The terminal device uses the position number of the bit whose value is the first value in the position indication information as the target position index.

In an example, when the bitmap of the position indication information is 111000000111000000000, the first value is 1, the second value is 0, and the bit whose position numbers are 0, 1, 2, 8, 9, 10, 0, 1, and 2 in the position indication information is set as 1, the target SSB position indexes include 0, 1, 2, 8, 9 and 10, and the target position index set is {0, 1, 2, 8, 9, 10}.

In S703, the terminal device performs SSB measurement on the target candidate positions corresponding to the target SSB position indexes in the measurement window.

The target SSB position index is the SSB position index of the candidate position where SSB measurement needs to be performed in the measurement window.

Optionally, when the candidate position corresponding to the target SSB position index is located before the LBT is successful, the terminal device cannot measure the SSB on the determined candidate position where SSB measurement needs to be performed; and when the candidate position corresponding to the target SSB position index is located after the LBT is successful, the terminal device measures the SSB on the determined candidate position where SSB measurement needs to be performed.

Figure 9:
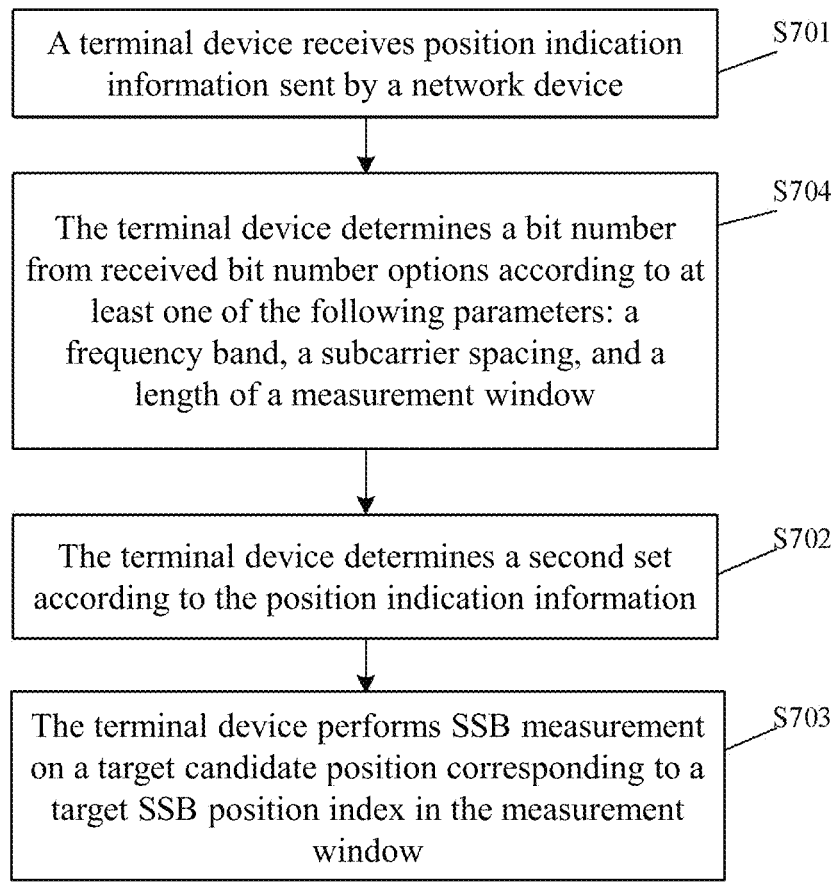
FIG. 9 is a schematic diagram of an optional processing flow of an information processing method according to an embodiment of the disclosure.

In the embodiment of the disclosure, in the case where the bit number of the position indication information is related to parameters such as the frequency band, the subcarrier spacing, and the length of the measurement window, before S702, as shown in FIG. 9, the method further includes the following.

In S704, the terminal device determines the bit number from bit number options according to at least one of the following parameters: the frequency band, the subcarrier spacing, and the length of the measurement window.

In the information processing method shown in FIG. 9, S704 is located after S701. In actual applications, the execution sequence of S704 and S701 is not limited.

The terminal device includes at least one bit number option. Optionally, in the case where the terminal device includes multiple bit number options, at least one of the following parameters corresponding to different bit number options is different: the frequency band, the subcarrier spacing, and the length of the measurement window.

The terminal device includes a corresponding relationship between the bit number option and at least one of the following parameters. The terminal device selects the bit number option matching one or more combinations among the frequency band, the subcarrier spacing, and the length of the measurement window currently used by the terminal device according to the included corresponding relationship as the bit number of the position indication information.

In an example, the corresponding relationship in the terminal device includes that when the subcarrier spacing is 15 KHz and the length of the measurement window is 1 ms, the bit number option is 2; when the subcarrier spacing is 15 KHz and the length of the measurement window is 2 ms, the bit number option is 4; when the subcarrier spacing is 15 KHz and the length of the measurement window is 3 ms, the bit number option is 6; when the subcarrier spacing is 30 KHz and the length of the measurement window is 1 ms, the bit number option is 4; when the subcarrier spacing is 30 KHz and the length of the measurement window is 2 ms, the bit number option is 8; when the subcarrier spacing is 30 KHz and the length of the measurement window is 3 ms, the bit number option is 12; and when the subcarrier spacing and the length of the measurement window currently used by the terminal device is 2 ms, the bit number of the position indication information is 4.

Optionally, the corresponding relationship in the terminal device is predefined. Optionally, the corresponding relationship in the terminal device is configured by the network device.

After the terminal device determines the bit number of the position indication information, the second set corresponding to the position indication information is determined according to the meaning of the bit representing the first set.

In the information processing method provided by the embodiment of the disclosure, through defining the meaning of the bit of the position indication information, the SSB position index of the candidate position that needs to be monitored is indicated through the position indication information, and at least one bit of the position indication information represents the first set including at least one SSB position index, the position of the SSB that needs to be measured can be correctly indicated in the system that uses the unlicensed spectrum, such as the NR-U system.

Hereinafter, taking the position indication information being the bitmap as an example, the information processing method provided by the embodiment of the disclosure will be illustrated through different examples.

Example 1

A terminal device obtains a bitmap of a set of SSBs used for measurement. A first bit in the bitmap corresponds to a set of position numbers of the SSBs having a first QCL relationship in a measurement window.

In the prior art, information indicated by an information element SSB-ToMeasure in a configured measurement object is an SSB index. A UE determines a time-frequency position of the measured SSB according to a one-to-one corresponding relationship between the SSB index and a sending time-frequency position of the SSB, thereby performing measurement. Also, the SSBs with different SSB indexes are not quasi co-located.

In Example 1, the SSB position index of the SSB and the time-frequency position of the SSB are in a one-to-one corresponding relationship, but the SSBs with different SSB position indexes may be quasi co-located. In a DRS transmission window, a base station does not send the SSBs which are quasi co-located at different positions, that is, the base station only sends the SSBs on one position in the SSB position indexes of the SSBs which are quasi co-located. The SSB position indexes of the SSBs which are quasi co-located are determined through Q indicated by the base station, that is, the SSBs with the same result of taking the remainder of Q for the SSB position indexes are quasi co-located, or according to the lowest three bits of the SSB position indexes, that is, the SSBs with the same result of taking the remainder of Q for a PBCH DMRS sequence index are quasi co-located.

In the example, the meaning of the bitmap indicated in a signaling SSB-ToMeasure in the measurement object configured by the base station is not the corresponding SSB position index, but a set of SSB position indexes with the same QCL assumption. Assuming Q=8, the base station uses an 8-bit bitmap in the SSB-ToMeasure to indicate which QCL assumed SSB positions are to be measured. For example, bitmap=11100000 represents that the SSBs are measured on the time-frequency positions of a SSB position index set corresponding to SSB position index mod Q=0, 1, and 2, and the SSBs are not measured on the time-frequency positions of the SSB position index set corresponding to SSB position index mod Q=3, 4, 5, 6, and 7.

Figure 10:
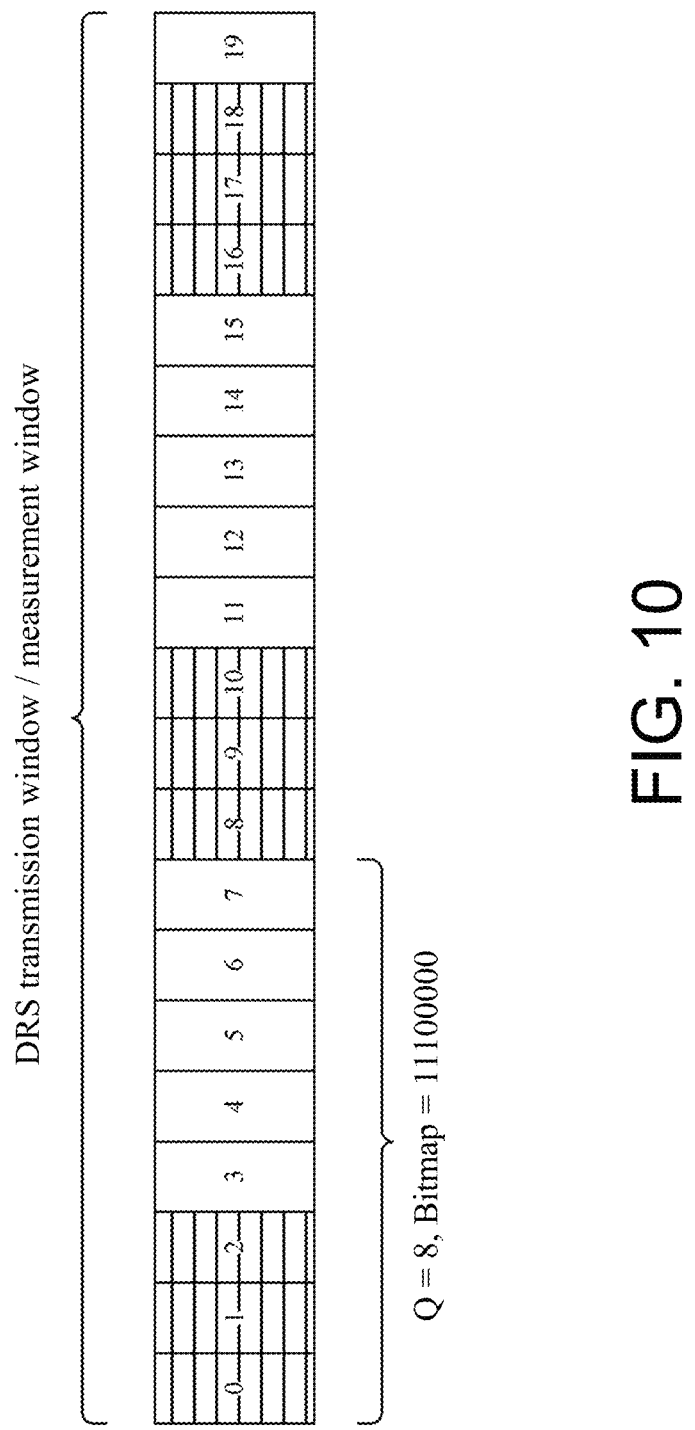
FIG. 10 is a schematic diagram of an optional SSB position index provided by an embodiment of the disclosure.

As shown in FIG. 10, when the subcarrier spacing is 30 kHz and the length of the measurement window is 5 ms, the bitmap is 11100000. Although only 3 bits in the bitmap are 1, on the 20 candidate positions, the SSB position index set corresponding to the 3 bits is {0, 1, 2, 8, 9, 10, 16, 17, 18}. The UE needs to perform SSB measurement on the candidate positions corresponding to the SSB position indexes.

When Q is less than 8, such as when Q is 1, 2, or 4, first Q bits in the 8-bit bitmap respectively correspond to the set of SSB position indexes corresponding to Q different QCL assumptions.

Based on the information processing method of Example 1, compared with the prior art, the bit number of the bitmap may be kept unchanged. Through reinterpreting the meaning of the bit in the bitmap, the position where the SSB needs to be measured is correctly indicated in an NR-U system.

Example 2

A terminal device obtains bitmap information of a position set of an SSB used for measurement. A first bit in the bitmap information corresponds to a first SSB position index in a measurement window. A bit number contained in the bitmap information is related to a subcarrier spacing of the SSB.

In an NR-U, the SSB is sent in a time window, and the specific sending position depends on the result of LBT of a base station. Different from Example 1, in the example, the meaning of a bitmap indicated in a signaling SSB-ToMeasure in a measurement object configured by the base station is an SSB position index in a DRS transmission window or the measurement window.

In the NR-U, the subcarrier spacing for measuring the SSB may be configured as 15 kHz or 30 kHz. For the DRS transmission window or the measurement window with a length of 5 ms, candidate positions in the DRS transmission window or the measurement window respectively include 10 positions and 20 positions. Correspondingly, bit numbers contained in the bitmap is 10 or 20, and each bit corresponds to an SSB position index. For example, the leftmost bit in the bitmap represents the SSB position index=0, the second bit from the left represents the SSB position index=1, and so on.

Further, the bit number contained in the bitmap is also related to the length of the configured DRS transmission window or measurement window. As shown in Table 1, under different subcarrier spacings and different window lengths, the bit numbers contained in the bitmap in the SSB-ToMeasure are different.

TABLE 1

Relationship between bit number and subcarrier spacing and length of measurement window

| Subcarrier spacing of SSB | Bit number contained in bitmap in SSB-ToMeasure | | | | |
|---|---|---|---|---|---|
| | 1 subframe | 2 subframes | 3 subframes | 4 subframes | 5 subframes |
| 15 kHz | 2 | 4 | 6 | 8 | 10 |
| 30 kHz | 4 | 8 | 12 | 16 | 20 |

1 subframe, 2 subframes, 3 subframes, 4 subframes, and 5 subframes in Table 1 above represent the lengths of different measurement windows.

The same as the candidate positions where SSB measurement needs to be performed in Example 1, in Example 2, the bitmap contains 20 bits, and each bit corresponds to the SSB position index of the SSB in the measurement window. The value of the bitmap in the bitmap being 1 represents that the UE measures the SSB on the position corresponding to the SSB position index corresponding to the bitmap, and 0 represents that the SSB is not measured on the position corresponding to the corresponding SSB position index.

In an example, the lengths, which are respectively 8, 12, and 20, of three types of bitmaps are defined through the information element SSB-ToMeasure. The terminal device selects one type from 8, 12, and 20 according to the length of the DRS transmission window or the measurement window, and the subcarrier spacing of the SSB. Which length of the bitmap to adopt may also be determined according to the specific window length and the subcarrier spacing. The lengths of the three bitmaps in the prior art may also be reused, which are respectively 4, 8, and 64.

Figure 11:
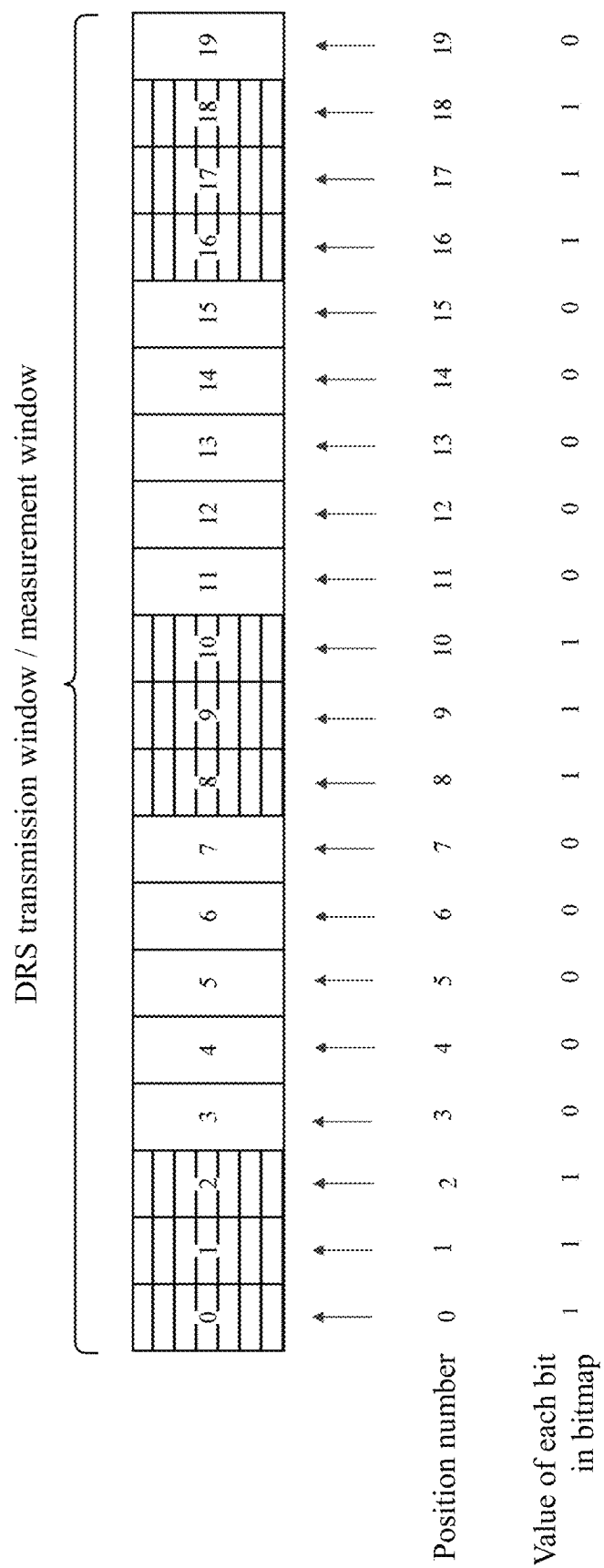
FIG. 11 is a schematic diagram of an optional SSB position index provided by an embodiment of the disclosure.

In the embodiment, the bit in the bitmap indicated in the information element SSB-ToMeasure in the measurement object configured by the base station is corresponded with the SSB position index in the measurement window. For example, when the subcarrier spacing of the SSB is 30 kHz and the window length is configured as 5 subframes, that is, 5 ms, the longBitmap in the example of the information element is used to indicate the position of the measured SSB. For example, as shown in FIG. 11, longBitmap=11100000111000001110 represents that the SSBs are measured on the time-frequency positions corresponding to the SSB position indexes 0, 1, 2, 8, 9, 10, 16, 17, and 18, and the SSBs are not measured on the time-frequency positions of the SSBs corresponding to the SSB position indexes 3, 4, 5, 6, 7, 11, 12, 13, 14, 15, and 19.

In Example 2, the position of the SSB that needs to be measured may be correctly indicated in the NR-U system. The position of the measured SSB configured in a measobject may be the result of superposition on the positions of the SSBs sent by multiple cells. Since the positions of the SSBs actually sent by the cells are different, the superimposed result may not strictly satisfy the relationship between the positions of the SSBs which are quasi co-located in a single cell. The method in the embodiment does not depend on the value of Q, and directly indicates the position of the measured SSB through the bitmap, which enables the base station to flexibly indicate to the UE of the position of the SSB that needs to be measured in the window.

Example 3

A terminal device obtains bitmap information of a set of SSBs used for measurement, and a bit in the bitmap information corresponds to a set of position numbers of SSBs in a measurement window. According to the value of the bit in the bitmap, whether to measure the SSB in the set of SSB position numbers corresponding to the bit is determined.

The difference between the present embodiment and Embodiment 1 is that the bitmap in Embodiment 1 needs to combine the indicated Q to determine the set of SSB position numbers in the measurement window corresponding to the bit in the bitmap information. In the embodiment, in essence, the bitmap information assumes a Q used to determine the set of SSB position numbers. For example, the corresponding relationship between the bit in the bitmap information and the set of position numbers of the SSBs in the measurement window is determined according to Q=8.

In an example, bitmap=11100000 represents that the SSBs on the time-frequency positions of a SSB position index set corresponding to SSB position index mod 8=0, 1, and 2 are measured, and the SSBs on the time-frequency positions of a SSB position index set corresponding to SSB position index mod 8=3, 4, 5, 6, and 7 are not measured. For the subcarrier spacing of 30 kHz and the measurement window of 5 ms, 8 bits of the bitmap may determine whether to measure the SSBs on the sending positions of 20 SSBs in the measurement window.

Figure 12:
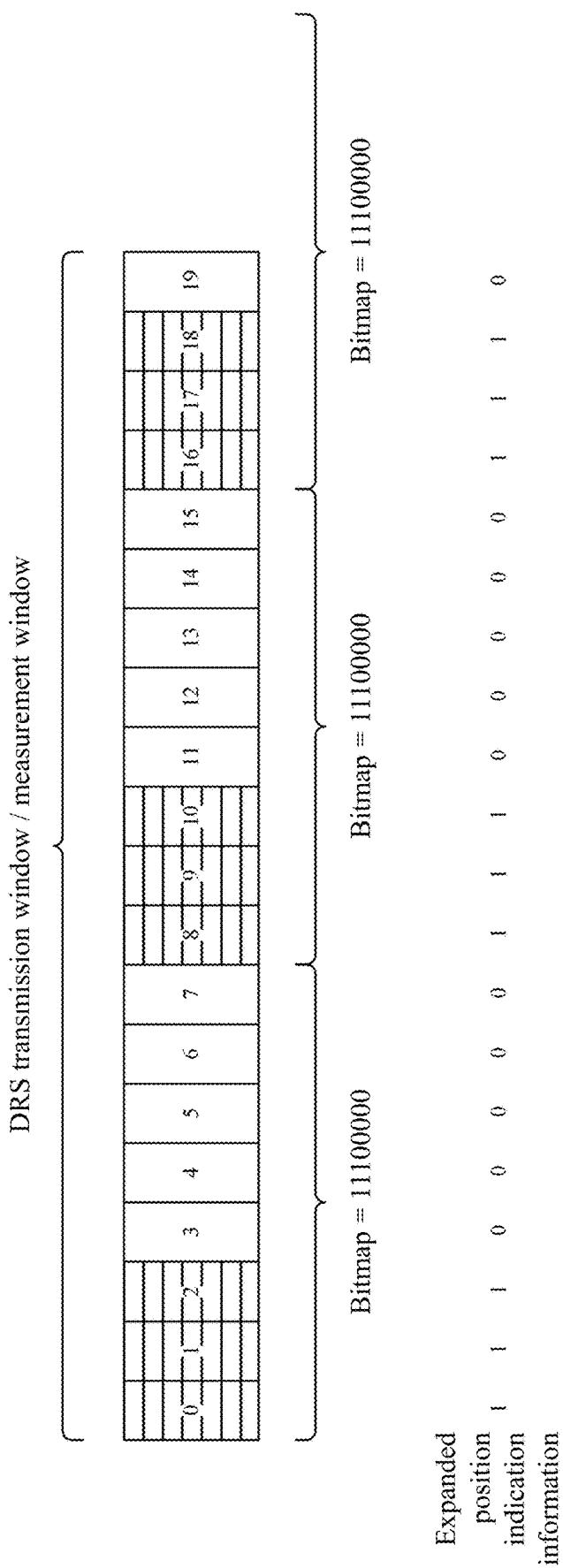
FIG. 12 is a schematic diagram of an optional SSB position index provided by an embodiment of the disclosure.

In an example, as shown in FIG. 12, the 8-bit bitmap is used to indicate whether to measure the SSBs on 8 consecutive SSB sending positions in the measurement window, for example, the sending positions of the first 8 SSBs. The position indication information for whether to measure on other positions in the measurement window is obtained through expanding the position indication information corresponding to the sending positions of the 8 SSBs to the sending positions of other SSBs. Here, the received bitmap=11100000, which is sequentially copied to the SSB positions numbered 8 to 19 in the measurement window with the positions of 8 SSBs as a unit, the expanded position indication information obtained by expanding the received bitmap is 111000001110000011110.

In Example 3, the bit number in the bitmap may be kept the same as the bit number in the prior art. Through reinterpreting the meaning of the bit in the bitmap, the position of the SSB that needs to be measured may be correctly indicated in the NR-U system. On the other hand, the position of the measured SSB may be directly indicated through the bitmap without relying on the value of Q indicated by the network device, so that the base station and the terminal device are not limited by the setting rules in Example 1 or Example 2, which enables the base station to flexibly indicate to the UE of the position of the SSB that needs to be measured in the window.

Figure 13:
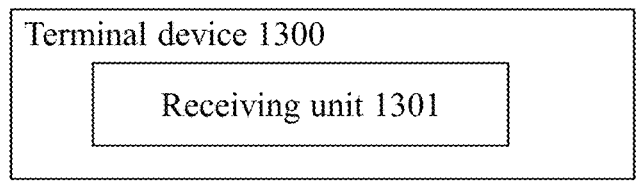
FIG. 13 is a schematic diagram of an optional structure of a terminal device according to an embodiment of the disclosure.

In order to implement the information processing method, an embodiment of the disclosure also provides a terminal device. The composition structure of the terminal device is shown in FIG. 13. A terminal device 1300 includes the following.

A receiving unit 1301 is configured to receive position indication information sent by a network device. At least one bit of the position indication information represents a first set including at least one SSB position index. The position indication information indicates position where SSB measurement needs to be performed in a measurement window.

In the embodiment of the disclosure, the position indication information is a bitmap.

In the embodiment of the disclosure, a bit number of the position indication information is a fixed number.

In the embodiment of the disclosure, the bit number of the position indication information is related to at least one of the following parameters: a frequency band, a subcarrier spacing, and a length of the measurement window.

In the embodiment of the disclosure, the terminal device further includes the following.

A second determining unit is configured to determine the bit number from bit number options according to at least one of the following parameters: the frequency band, the subcarrier spacing, and the length of the measurement window.

In the embodiment of the disclosure, the number of SSB position indexes in the first set is greater than 1.

In the embodiment of the disclosure, SSBs carried on candidate positions corresponding to the SSB position indexes in the first set are quasi co-located.

In the embodiment of the disclosure, a relationship between the bit and the SSB position index in the first set includes the following.

A result of SSB position indexes in the first set mod a specified value being the same; wherein the results have a corresponding relationship with the bit.

In the embodiment of the disclosure, a manner for determining the result includes the following.

The remainder of the specified value is taken through lowest three bits of the SSB position indexes.

Alternatively, the remainder of the specified value is taken through a DMRS sequence index of a PBCH corresponding to the SSB position indexes.

In the embodiment of the disclosure, the specified value is:
  pre-defined by the terminal device; or
  indicated by the network device.

In the embodiment of the disclosure,
  the SSB position indexes of a part of the candidate positions in the measurement window correspond to the position indication information;
  the position indication information corresponding to the SSB position indexes of the candidate positions other than the part of the candidate positions in the measurement window is determined by the position indication information corresponding to the SSB position indexes of the part of the candidate positions.

In the embodiment of the disclosure, a manner for determining the position indication information corresponding to the SSB position indexes of the candidate positions other than the part of the candidate positions in the measurement window according to the position indication information corresponding to the SSB position indexes of the candidate positions of the part of the candidate positions includes the following.

The position indication information corresponding to the SSB position indexes of the part of the candidate positions is copied, so that a sum of the bit number of the position indication information corresponding to the SSB position indexes of the part of the candidate positions and the bit number of the copied position indication information is the same as the number of candidate positions in the measurement window.

In the embodiment of the disclosure, the number of SSB position indexes in the first set is 1, and the bit corresponds to the SSB position index in the first set.

An embodiment of the disclosure also provides a terminal device, which includes a processor and a memory for storing a computer program capable of running on the processor, wherein the processor is used to execute the steps of the information processing method executed by the terminal device when running the computer program.

Figure 14:
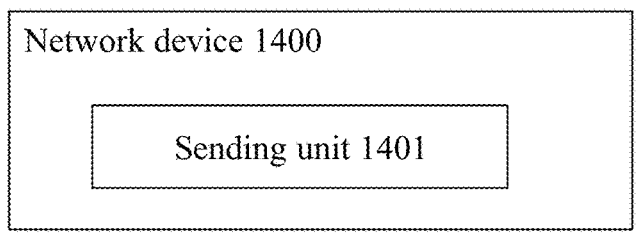
FIG. 14 is a schematic diagram of an optional structure of a network device according to an embodiment of the disclosure.

In order to implement the information processing method, an embodiment of the disclosure also provides a network device. The composition structure of the terminal device is as shown in FIG. 14. A network device 1400 includes the following.

A sending unit 1401 is configured to send position indication information to a terminal device. At least one bit of the position indication information represents a first set including at least one SSB position index. The position indication information indicates position where SSB measurement needs to be performed in a measurement window of the terminal device measurement.

In the embodiment of the disclosure, the position indication information is a bitmap.

In the embodiment of the disclosure, a bit number of the position indication information is a fixed number.

In the embodiment of the disclosure, the bit number of the position indication information is related to at least one of the following parameters: a frequency band, a subcarrier spacing, and a length of the measurement window.

In the embodiment of the disclosure, the number of SSB position indexes in the first set is greater than 1.

In the embodiment of the disclosure, SSBs carried on candidate positions corresponding to the SSB position indexes in the first set are quasi co-located.

In the embodiment of the disclosure, a relationship between the bit and the SSB position index in the first set includes the following.

A result of SSB position indexes in the first set mod a specified value being the same; wherein the results have a corresponding relationship with the bit.

In the embodiment of the disclosure, a manner for determining the result includes the following.

The remainder of the specified value is taken through lowest three bits of the SSB position indexes.

Alternatively, the remainder of the specified value is taken through a DMRS sequence index of a PBCH corresponding to the SSB position indexes.

In the embodiment of the disclosure, the network device further includes the following.

A configuration unit is configured to configure the specified value to the terminal device.

In the embodiment of the disclosure,
the SSB position indexes of a part of the candidate positions in the measurement window correspond to the position indication information;
the position indication information corresponding to the SSB position indexes of the candidate positions other than the part of the candidate positions in the measurement window is determined by the position indication information corresponding to the SSB position indexes of the part of the candidate positions.

In the embodiment of the disclosure, a manner for determining the position indication information corresponding to the SSB position indexes of the candidate positions other than the part of the candidate positions in the measurement window according to the position indication information corresponding to the SSB position indexes of the candidate positions of the part of the candidate positions includes the following.

The position indication information corresponding to the SSB position indexes of the part of the candidate positions is copied, so that a sum of the bit number of the position indication information corresponding to the SSB position indexes of the part of the candidate positions and the bit number of the copied position indication information is the same as the number of candidate positions in the measurement window.

In the embodiment of the disclosure, the number of SSB position indexes in the first set is 1, and the bit corresponds to the SSB position index in the first set.

An embodiment of the disclosure also provides a network device, which includes a processor and a memory for storing a computer program capable of running on the processor, wherein the processor is used to execute the steps of the information processing method executed by the network device when running the computer program.

Figure 15:
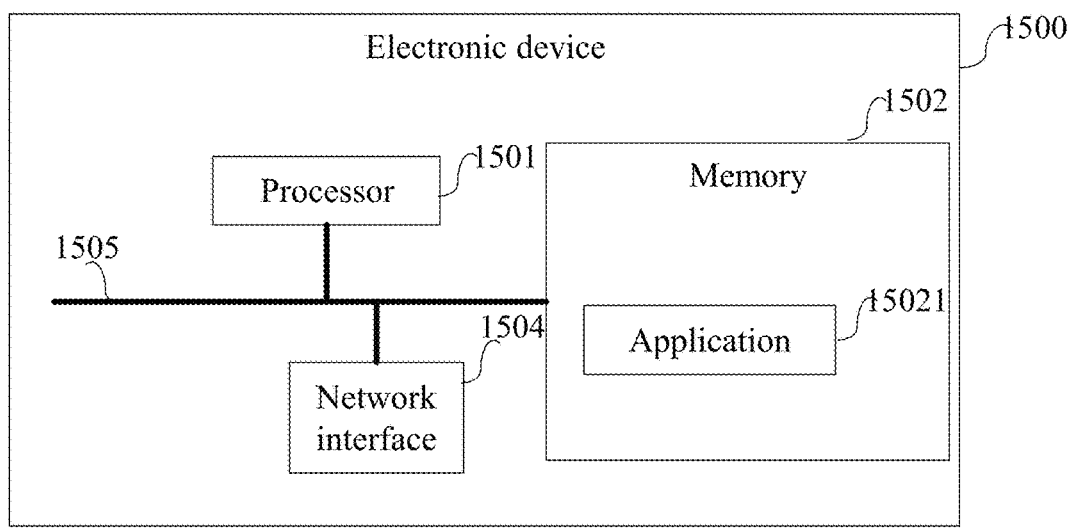
FIG. 15 is a schematic diagram of an optional structure of an electronic device provided by an embodiment of the disclosure.

FIG. 15 is a schematic diagram of a hardware composition structure of an electronic device (a terminal device or a network device) according to an embodiment of the disclosure. An electronic device 1500 includes at least one processor 1501, a memory 1502, and at least one network interface 1504. Various components in the electronic device 1500 are coupled together through a bus system 1505. It can be understood that the bus system 1505 is used to implement connection and communication between the components. In addition to data bus, the bus system 1505 also includes a power bus, a control bus, and a status signal bus. However, for the sake of clarity, various buses are marked as the bus system 1505 in FIG. 15.

It can be understood that the memory 1502 may be a volatile memory or a non-volatile memory or may include both the volatile and non-volatile memories. The non-volatile memory may be a ROM, a programmable ROM (PROM), an erasable PROM (EPROM), an electrically EPROM (EEPROM), a ferromagnetic ROM (FRAM), a flash memory, a magnetic surface memory, a compact dis, or a compact disc ROM (CD-ROM); and the magnetic surface memory may be a disk memory or a tape memory. The volatile memory may be a random access memory (RAM), which is used as an external cache. Through exemplary but not restrictive description, many forms of RAMs may be used, such as a static RAM (SRAM), a synchronous RAM (SSRAM), a dynamic RAM (DRAM), a synchronous DRAM (SDRAM), a double data rate SDRAM (DDRSDRAM), an enhanced SDRAM (ESDRAM), a synchlink DRAM (SLDRAM), and a direct rambus RAM (DRRAM). The memory 1502 described in the embodiment of the disclosure is intended to include, but is not limited to, the memories and any other suitable types of memories.

The memory 1502 in the embodiment of the disclosure is used to store various types of data to support the operation of the electronic device 1500. Examples of the data include any computer program used for operation on the electronic device 1500, such as an application 15021. A program for implementing the method of the embodiment of the disclosure may be contained in the application 15021.

The method disclosed in the above embodiment of the disclosure may be applied to the processor 1501 or implemented by the processor 1501. The processor 1501 may be an integrated circuit chip with signal processing capabilities. During the implementation process, each step of the method may be completed by a hardware integrated logic circuit in the processor 1501 or commands in the form of software. The processor 1501 may be a general processor, a digital signal processor (DSP), or other programmable logic devices, discrete gates or transistor logic devices, discrete hardware components, etc. The processor 1501 may implement or execute the method, steps, and logical block diagrams disclosed in the embodiments of the disclosure. The general processor may be a microprocessor or any conventional processor, etc. Combining the steps of the method disclosed in the embodiment of the disclosure may be directly embodied as execution and completion by a hardware decoding processor or execution and completion by a combination of hardware and software modules in the decoding processor. The software module may be located in a storage medium. The storage medium is located in the memory 1502. The processor 1501 reads information in the memory 1502, and completes the steps of the method in combination with the hardware thereof.

In an exemplary embodiment, the electronic device 1500 may be implemented by one or more application specific integrated circuit (ASIC), DSP, programmable logic device (PLD), complex PLD (CPLD), FPGA, general processor, controller, MCU, MPU, or other electronic elements to execute the above method.

The embodiment of the disclosure also provides a storage medium for storing a computer program.

Optionally, the storage medium may be applied to a terminal device in the embodiment of the disclosure, and the computer program enables a computer to execute the corresponding process implemented in each method of the embodiment of the disclosure, which will not be repeated here for the sake of brevity.

Optionally, the storage medium may be applied to a network device in the embodiment of the disclosure, and the computer program enables the computer to execute the corresponding process in each method of the embodiment of the disclosure, which will not be repeated here for the sake of brevity.

The disclosure is described with reference to flowcharts and/or block diagrams of methods, devices (systems), and computer program products according to the embodiments of the disclosure. It should be understood that each process and/or block in the flowchart and/or the block diagram, and a combination of processes and/or blocks in the flowcharts and/or the block diagrams may be implemented by computer program commands. The computer program commands may be provided to a general computer, a special-purpose computer, an embedded processor, or a processor of other programmable data processing devices to generate a machine, so that commands executed through the computer or the processor of other programmable data processing devices generate a device for implementing the functions specified in one step or multiple steps in the flowchart and/or one block or multiple blocks in the block diagram.

The computer program commands may also be stored in a computer-readable memory that can guide the computer or other programmable data processing devices to work in a specific manner, so that the commands stored in the computer-readable memory generate a manufacturing product including a command device. The command device implements the functions specified in one step or multiple steps in the flowchart and/or one block or multiple blocks in the block diagram.

The computer program commands may also be loaded onto the computer or other programmable data processing devices, so that a series of operation steps are executed on the computer or other programmable devices to generate computer-implemented processing, so that the commands executed on the computer or other programmable devices provide the steps for implementing the functions specified in one step or multiple steps in the flowchart and/or one block or multiple blocks in the block diagram.

The above are only the preferred embodiments of the disclosure and are not used to limit the protection scope of the disclosure. Any modification, equivalent replacement, and improvement made within the spirit and principle of the disclosure shall be included in the protection scope of the disclosure.

What is claimed is:

1. An information processing method for shared spectrum, comprising:
    receiving, by a terminal device, position indication information sent by a network device,
        wherein the position indication information comprises a plurality of bits, and each bit of a part of the plurality of bits represents a first set, or each bit of all of the plurality of bits represents a first set,
        wherein the first set comprises a plurality of synchronization signal block (SSB) position indexes, and the position indication information indicates a position where a SSB measurement needs to be performed in a measurement window, and
        wherein the position indication information is a bitmap in which each bit of bits of the bitmap is either a first value or a second value where candidate positions corresponding to the SSB position indexes in the first set represented by the first value is required to perform a SSB measurement and candidate positions corresponding to the SSB position indexes in the first set represented by the second value is not required to perform any SSB measurement.

2. The method according to claim 1, wherein a bit number of the position indication information is a fixed number.

3. The method according to claim 1, wherein a number of the SSB position indexes in the first set is greater than 1,
    wherein SSBs carried on candidate positions corresponding to the SSB position indexes in the first set are quasi co-located, and
    wherein a relationship between the bit and the SSB position indexes in the first set comprises:
        a result of SSB position indexes in the first set mod a specified value being the same; wherein the results have a corresponding relationship with the bit.

4. The method according to claim 3, wherein a manner for determining the results comprises:
    taking the remainder of the specified value through lowest three bits of the SSB position indexes; or
    taking the remainder of the specified value through a demodulation reference signal (DMRS) sequence index of a physical broadcast channel (PBCH) corresponding to the SSB position indexes, wherein the specified value is:
        pre-defined by the terminal device; or
        indicated by the network device.

5. An information processing method for shared spectrum, comprising:
    sending, by a network device, position indication information to a terminal device,
        wherein the position indication information comprises a plurality of bits, and each bit of a part of the plurality of bits represents a first set, or each bit of all of the plurality of bits represents a first set,
        wherein the first set comprises a plurality of synchronization signal block (SSB) position indexes, and the position indication information indicates a position where a SSB measurement needs to be performed in a measurement window of the terminal device, and
        wherein the position indication information is a bitmap in which each bit of bits of the bitmap is either a first value or a second value where candidate positions corresponding to the SSB position indexes in the first set represented by the first value is required to perform a SSB measurement and candidate positions corresponding to the SSB position indexes in the first set represented by the second value is not required to perform any SSB measurement.

6. The method according to claim 5, wherein a bit number of the position indication information is a fixed number.

7. The method according to claim 5,
    wherein a number of the SSB position indexes in the first set is greater than 1, wherein SSBs carried on candidate positions corresponding to the SSB position indexes in the first set are quasi co-located, and wherein a relationship between the bit and the SSB position indexes in the first set comprises:
a result of SSB position indexes in the first set mod a specified value being the same; wherein the results have a corresponding relationship with the bit.

8. The method according to claim 7, wherein a manner for determining the result comprises:
taking the remainder of the specified value through lowest three bits of the SSB position indexes; or
taking the remainder of the specified value through a demodulation reference signal (DMRS) sequence index of a physical broadcast channel (PBCH) corresponding to the SSB position indexes, wherein the method further comprises:
configuring, by the network device, the specified value to the terminal device.

9. A terminal device, comprising:
a receiver, configured to receive position indication information sent by a network device,
wherein the position indication information comprises a plurality of bits, and each bit of a part of the plurality of bits represents a first set, or each bit of all of the plurality of bits represents a first set,
wherein the first set comprises a plurality of SSB position indexes, and the position indication information indicates a position where a SSB measurement needs to be performed in a measurement window, and
wherein the position indication information is a bitmap in which each bit of bits of the bitmap is either a first value or a second value where candidate positions corresponding to the SSB position indexes in the first set represented by the first value is required to perform a SSB measurement and candidate positions corresponding to the SSB position indexes in the first set represented by the second value is not required to perform any SSB measurement.

10. The terminal device according to claim 9, wherein a bit number of the position indication information is a fixed number.

11. The terminal device according to claim 9,
wherein a number of the SSB position indexes in the first set is greater than 1, wherein SSBs carried on candidate positions corresponding to the SSB position indexes in the first set are quasi co-located, and
wherein a relationship between the bit and the SSB position indexes in the first set comprises:
a result of SSB position indexes in the first set mod a specified value being the same; wherein the results have a corresponding relationship with the bit.

12. The terminal device according to claim 11, wherein a manner for determining the result comprises:
taking the remainder of the specified value through lowest three bits of the SSB position indexes; or
taking the remainder of the specified value through a demodulation reference signal (DMRS) sequence index of a physical broadcast channel (PBCH) corresponding to the SSB position indexes, wherein the specified value is:
pre-defined by the terminal device; or
indicated by the network device.

13. A network device, comprising:
a transmitter, configured to send position indication information to a terminal device, wherein the position indication information comprises a plurality of bits, and each bit of a part of the plurality of bits represents a first set, or each bit of all of the plurality of bits represents a first set,
wherein the first set comprises a plurality of synchronization signal block (SSB) position indexes, and the position indication information indicates a position where a SSB measurement needs to be performed in a measurement window of the terminal device, and
wherein the position indication information is a bitmap in which each bit of bits of the bitmap is either a first value or a second value where candidate positions corresponding to the SSB position indexes in the first set represented by the first value is required to perform a SSB measurement and candidate positions corresponding to the SSB position indexes in the first set represented by the second value is not required to perform any SSB measurement.

14. The network device according to claim 13, wherein a bit number of the position indication information is a fixed number.

15. The network device according to claim 13,
wherein a number of the SSB position indexes in the first set is greater than 1,
wherein SSBs carried on candidate positions corresponding to the SSB position indexes in the first set are quasi co-located, and
wherein a relationship between the bit and the SSB position indexes in the first set comprises:
a result of SSB position indexes in the first set mod a specified value being the same; wherein the results have a corresponding relationship with the bit.

16. The network device according to claim 15, wherein a manner for determining the result comprises:
taking the remainder of the specified value through lowest three bits of the SSB position indexes; or
taking the remainder of the specified value through a demodulation reference signal (DMRS) sequence index of a physical broadcast channel (PBCH) corresponding to the SSB position indexes, wherein the network device further comprises:
a configuration unit, configured to configure the specified value to the terminal device.

* * * * *